United States Patent

[11] 3,609,313

| [72] | Inventor | Rene Lucien<br>Neuilly-sur-Sein, France |
|---|---|---|
| [21] | Appl. No. | 796,636 |
| [22] | Filed | Jan. 15, 1969 |
| [45] | Patented | Sept. 28, 1971 |
| [73] | Assignee | Societe Anonyme dite<br>Messier, Paris, France |
| [32] | Priority | Jan. 16, 1968 |
| [33] | | France |
| [31] | | 136,271 |

[54] REGULATION SYSTEM FOR THE HYDRAULIC CONTROL OF BRAKING OF A VEHICLE WITH PNEUMATIC TIRES
10 Claims, 27 Drawing Figs.

[52] U.S. Cl. .................................................235/150.24,
73/517 A, 188/181 A, 303/21 A, 303/21 BE,
303/21 CG, 235/197
[51] Int. Cl. .................................................... G06g 7/70,
B60t 8/12
[50] Field of Search............................................235/150.24;
303/21 A, 21 BE, 21 BB, 21 CG; 188/181; 73/514
(517)

[56] References Cited
UNITED STATES PATENTS
| 3,301,608 | 1/1967 | Harned et al. ................ | 303/21 |
| 3,362,757 | 1/1968 | Marcheron .................... | 303/21 |
| 3,382,012 | 5/1968 | Lucien ......................... | 303/21 |
| 3,508,795 | 4/1970 | Scharlack et al. ............. | 303/21 |

*Primary Examiner*—Malcolm A. Morrison
*Assistant Examiner*—Felix D. Gruber
*Attorney*—Waters, Roditi, Schwartz & Nissen ABSTRACT: A regulation system for the hydraulic control of braking of a vehicle with pneumatic tires, comprises first, second and third regulation circuits and the slip computer, a first regulation circuit acting as a function of the deceleration of the vehicle, and of the pilot's order, the second circuit being for integral regulation with respect to a wheel slip having a predetermined reference value proportional to the pilot's order, and the third circuit being for regulation as a function of the slip, with a continuously variable gain and preferably having a parabolic form. The computer is intended to receive at its inputs the signals representing the angular speed $\omega$ of the vehicle and $\omega'$ of a braked wheel, and it multiplies their difference by the sum of a constant and a factor proportional to $\omega$ reduced by a factor proportional to the logarithm of $\omega$. The first or deceleration regulation circuit has two levels of gain, one for a fraction of the pilot's signal and the other for the vehicle-speed signal, these two gains being reduced when the slip exceeds a predetermined reference value, these reductions in gain being locked after a certain time-delay. Means are provided for rendering all the regulation circuits inoperative at low running speed of the vehicle.

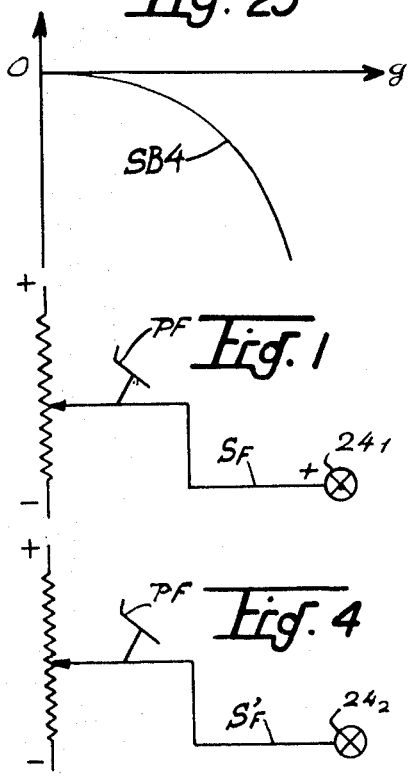
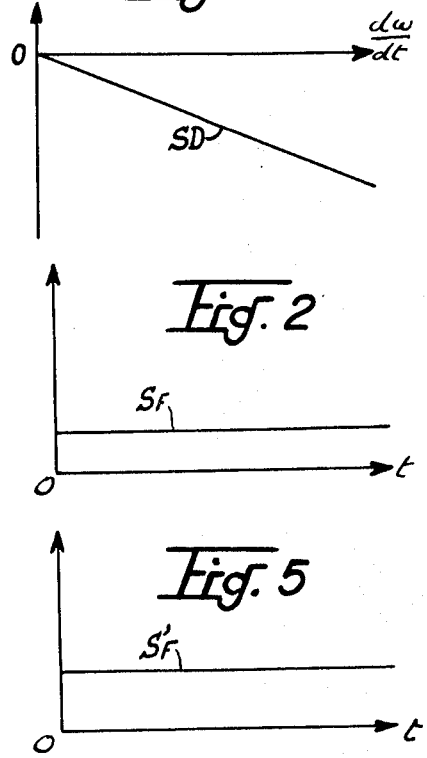
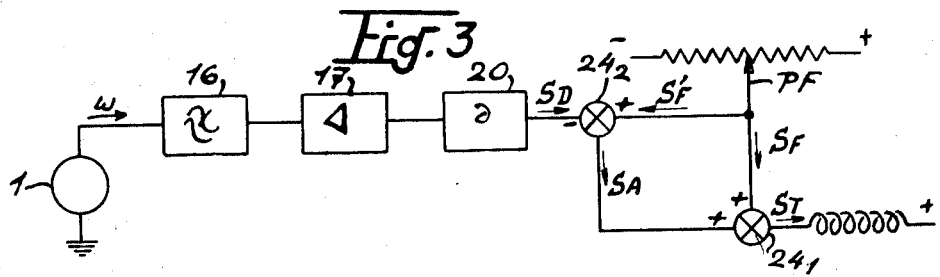
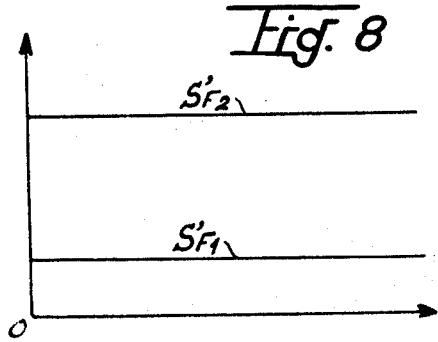

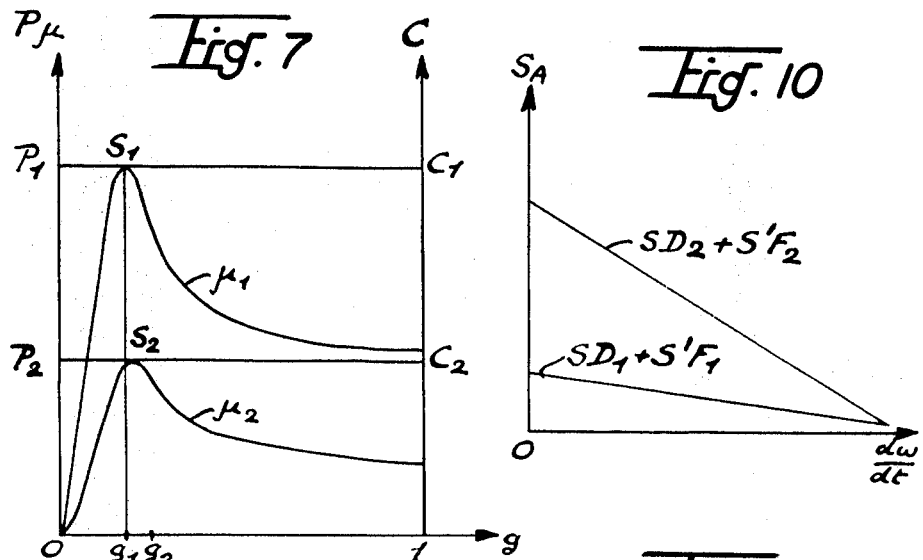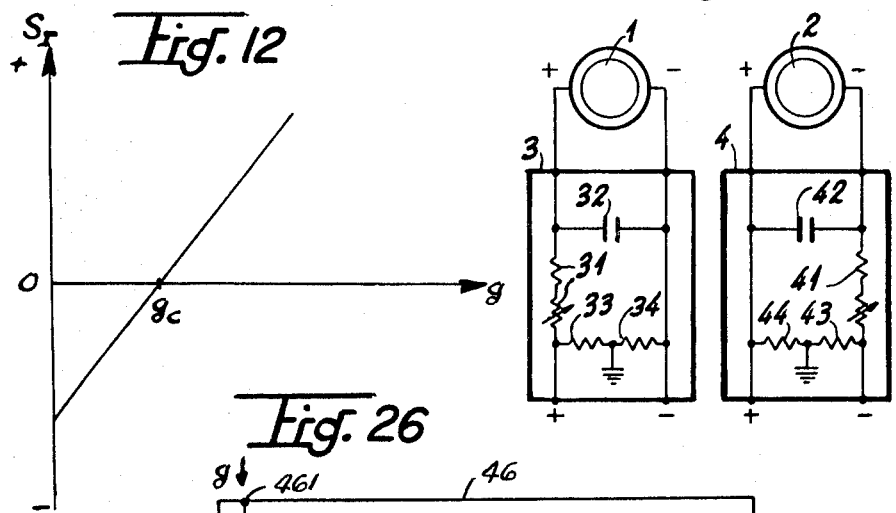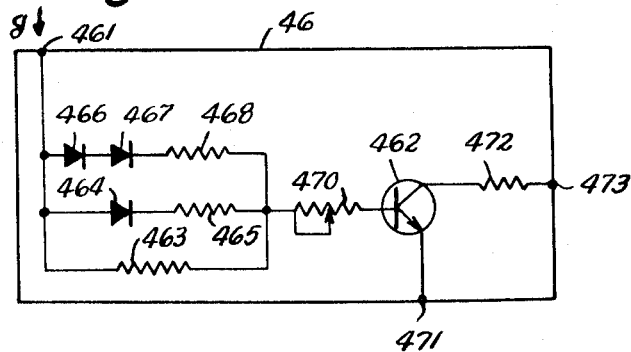

Fig. 11

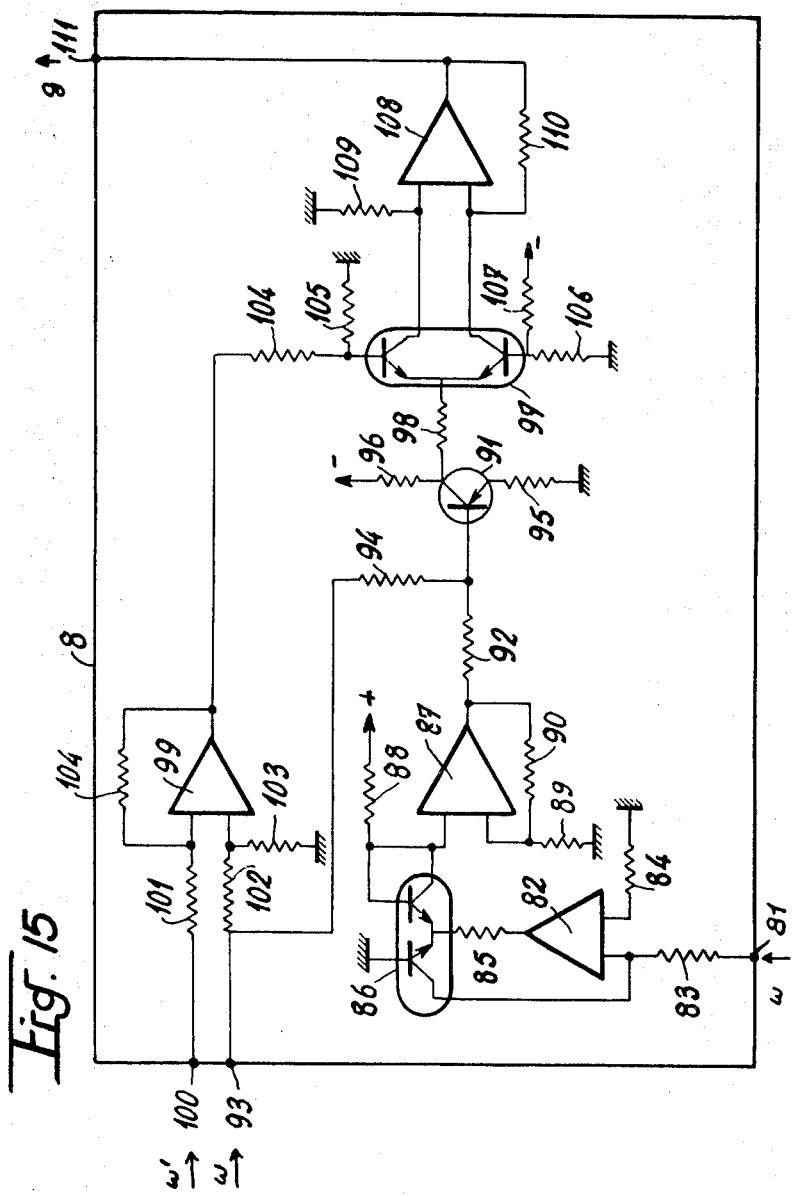

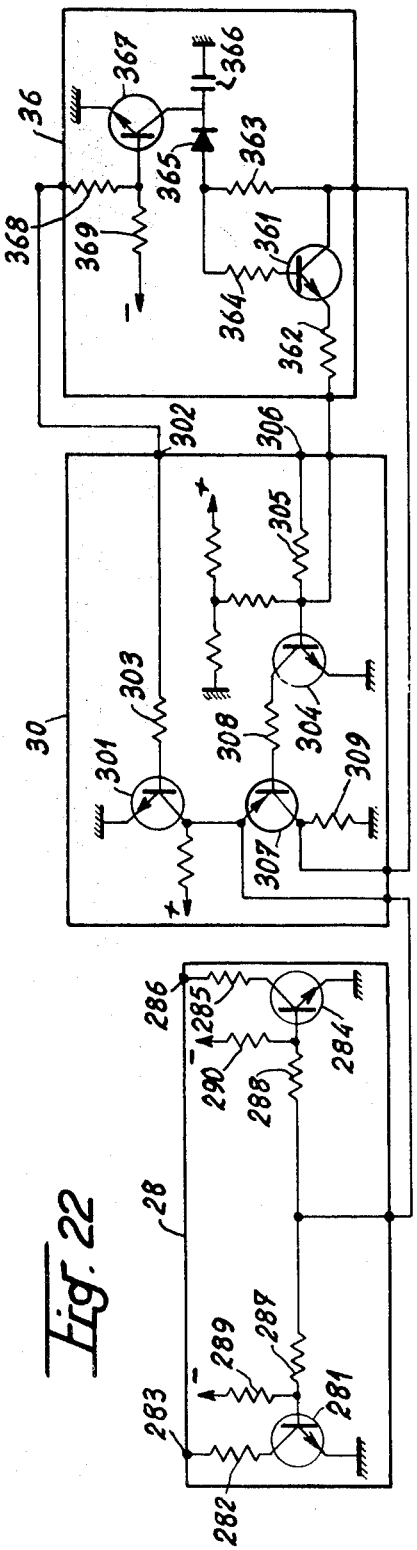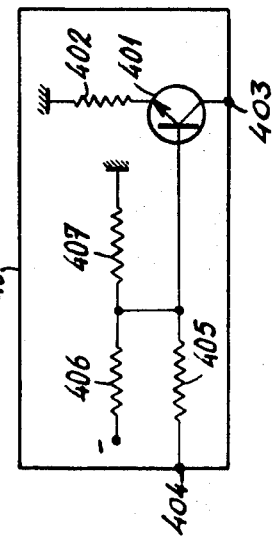

REGULATION SYSTEM FOR THE HYDRAULIC CONTROL OF BRAKING OF A VEHICLE WITH PNEUMATIC TIRES

The present invention relates to the regulation of the braking control of a vehicle on wheels with pneumatic tires, that is to say, more exactly, to methods and devices for automatically ensuring, within the limit fixed by the braking control actuated by the pilot of the vehicle, the best possible braking at every instant, having regard to the instantaneous local conditions of adhesion between the tires and the ground.

It will first be recalled what is known as the slip g:

$$g=(\omega-\omega')/(\omega)$$

the quotient of the difference between the angular speeds $\omega$ of the vehicle and $\omega'$ of the braked wheel, by the speed $\omega$ of the vehicle.

The main object of the present invention is to use the information regarding the wheel-ground slip directly in order to regulate the braking pressure.

The present invention comprises three main loops of regulation, or in other words three different and simultaneous uses of the signals $\omega$ and $\omega'$ at the input in order to regulate the braking pressure.

Briefly, the present invention comprises a regulation circuit which approximately adjusts the braking pressure applied by the pilot, as a function of the deceleration of the vehicle, which enables the amplitudes of the pressure modulation to be reduced and thereby avoids the inception of vibratory conditions of the axles which carry the wheels.

The present invention also provides for another regulation circuit, namely a complete regulation circuit for the braking pressure with respect to a predetermined reference value of slip, in order to improve operation on ground having a variable coefficient of friction with its resultant transient conditions.

The present invention also comprises a further regulation circuit, namely a circuit of regulation proportional to the slip.

A regulation proportional to the slip is already known from U.S. Pat. No. 3,394,967 which describes a braking controller device for a wheeled vehicle. This patent utilizes in particular a pressure regulation proportional to the wheel-ground slip and with a gain adjustable in steps as a function of the value of this slip, this regulation being effected by summation of corrections proportional to the parameters of the braking order by the pilot, $\omega$ and $\omega'$. It will be explained that the above patent describes the use of a regulation, with a gain adjustable in steps, of the braking pressure as a function of the slip, this gain having successively three different and increasing values, the first of which is not zero and cannot be zero, whereas the present invention is concerned with a regulation having a continuously variable gain, that is to say which follows a uniform curve without any discontinuity, preferably having a parabolic form. It will be observed that in this way the gain increases starting from zero, which could not be obtained by the method of the above U.S. Pat. No. 3,394,967 and which has the advantages of a greater flexibility of operation. It will also be observed that this continuous increase in gain avoids the transition conditions associated with the changeover from one value of the gain to another value, in accordance with the above-cited patent. The present invention thus makes it possible simultaneously to simplify the construction of the circuit giving a regulation proportional to the slip and to obtain superior performances from this circuit.

The regulation of pressure according to the invention, necessitates, as will be seen later, the use of a slip computer utilizing as input data the angular speeds of rotation $\omega$ of an unbraked wheel and $\omega'$ of a braked wheel, and calculating the slip g with the precision necessary in this case. More precisely, for an accurate operation of the regulation of slip, it is necessary to know the slip of the braked wheel as exactly as possible. A computer is therefore essential. It has already been noted that:

$$g=(\omega-\omega')/(\omega)$$

The exact calculation of $1/\omega$ cannot be carried out electronically, but the invention provides a method of calculation it with sufficient accuracy. This method applies to the formula:

$$1/\omega \cong a+b\omega-K\,Log\,\omega$$

To generate a signal corresponding to $1/\omega$ the slip computer comprises a logarithmic amplifier which receives the signal $\omega$ and delivers the signal $K\,Log\,\omega$. The calculation of $\omega-\omega'$ by algebraic summation is easily effected (difference between two currents). The two signals representing $1/\omega$ and $\omega-\omega'$ are then fed into a multiplier which delivers a signal representing the slip at any moment of the braking.

In order to convert the electric output signals from its regulations to braking pressure, the present invention utilizes a tranducer-amplifier with four coils (B1, B2, B3 and B4) forming the object of U.S. Pat. application Ser. No. 548,301, filed May 6, 1966 of the same applicant and known as a TR control device in the remainder of the present text. This control device does not form part of the present invention, and will not be otherwise described.

The invention and one preferred form of embodiment of the invention will now be described with reference to the accompanying drawings, given by way of example and not in any limitative sense. In these drawings:

FIG. 1 is a basic diagram showing how the signal represented by FIG. 2 is obtained in the regulation by deceleration according to the invention;

FIG. 3 is a partial basic diagram of the said regulation, showing the utilization of the said signal together with another signal obtained by the diagram in accordance with FIG. 4 and shown in FIG. 5, and of a still further signal shown in FIG. 6;

FIG. 7 is an explanatory diagram based on the conventional curves of the coefficient of adhesion as a function of the slip;

Figure 13:
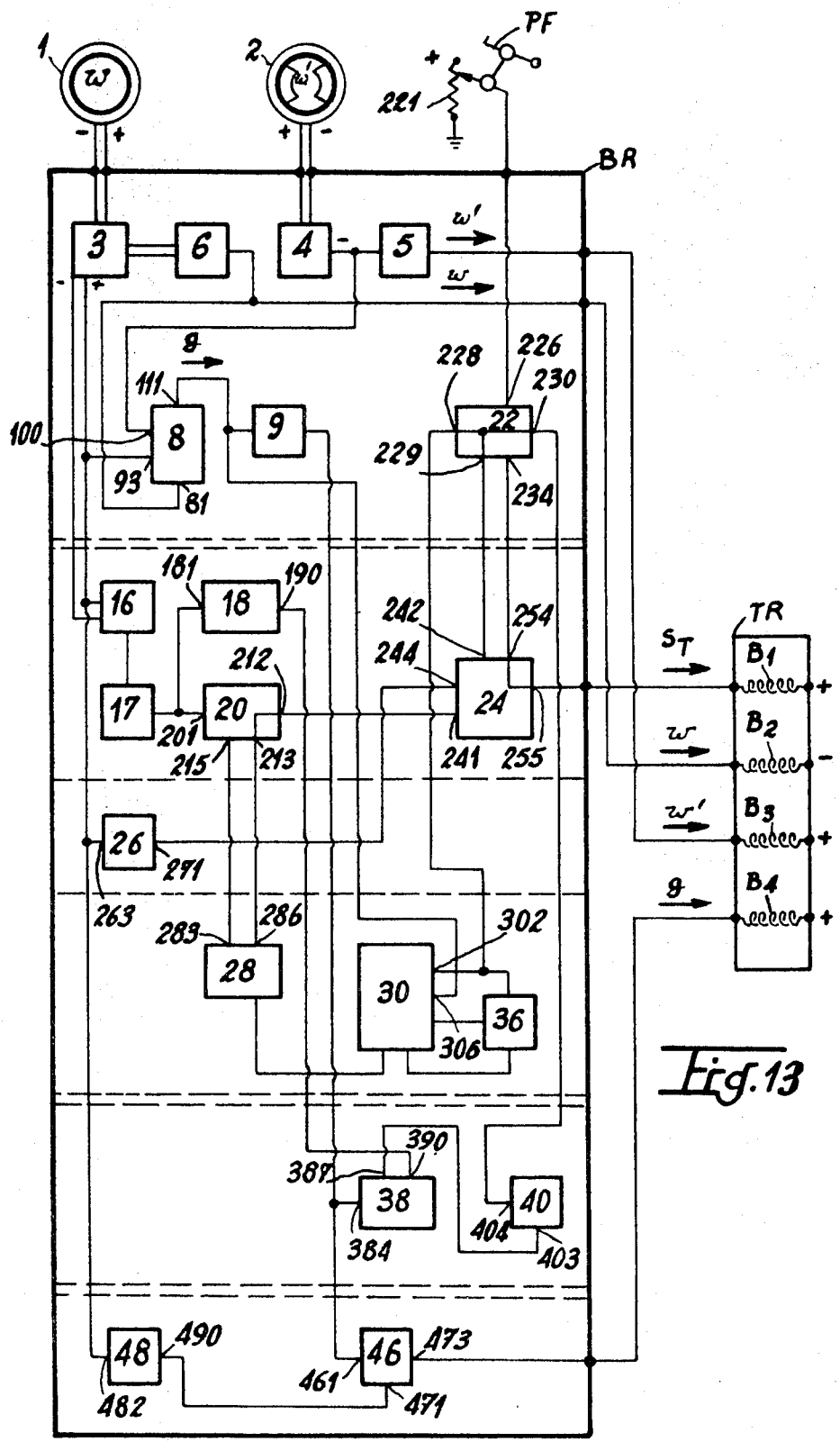
Figure 27:
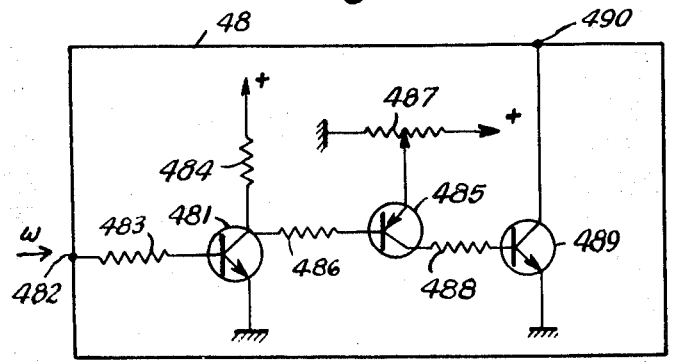
Figure 16:
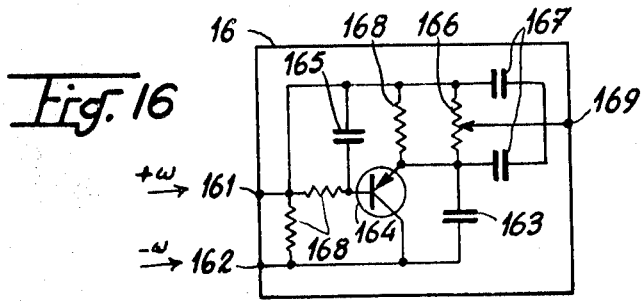
Figure 17:
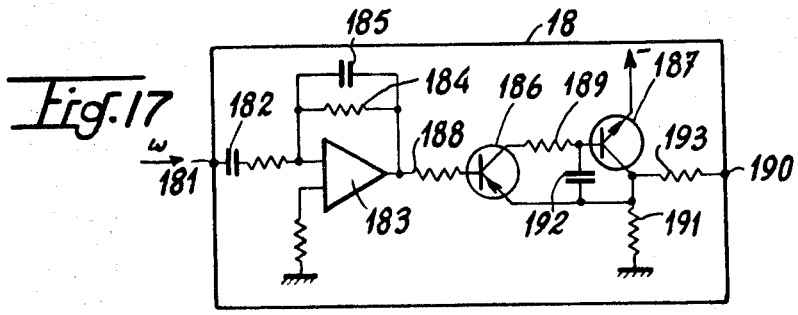
Figure 18:
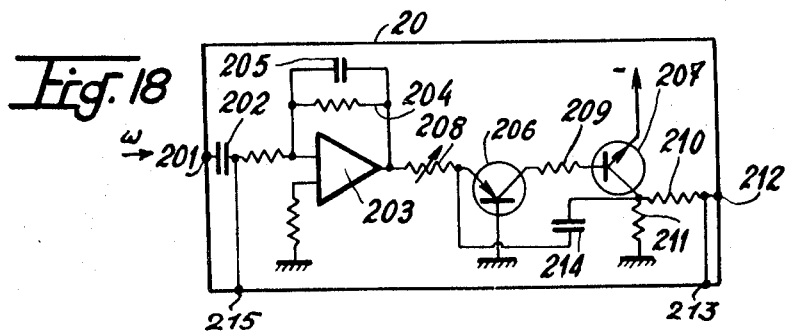
Figure 19:
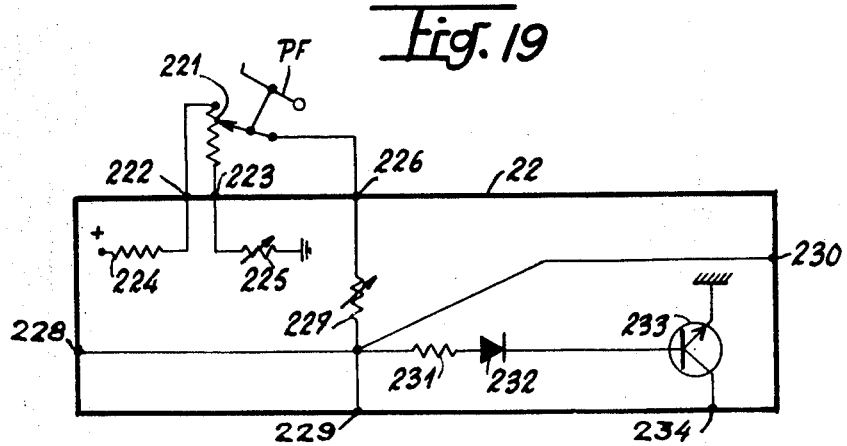
Figure 20:
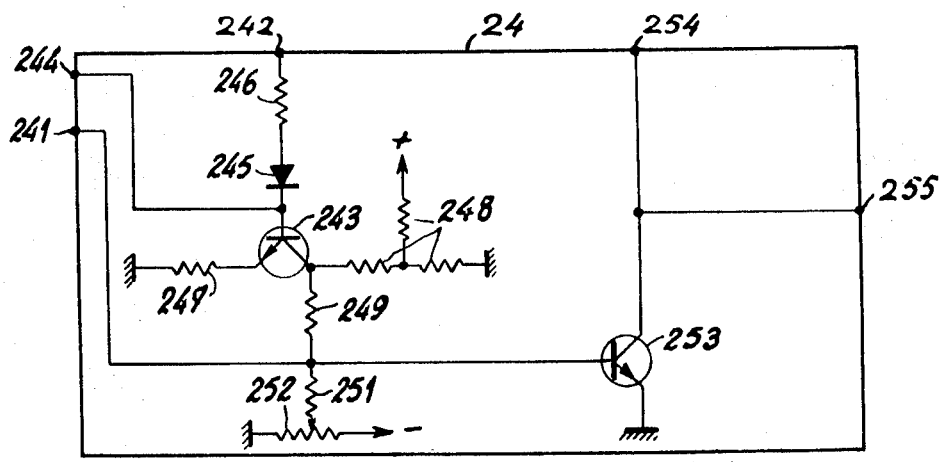
Figure 21:
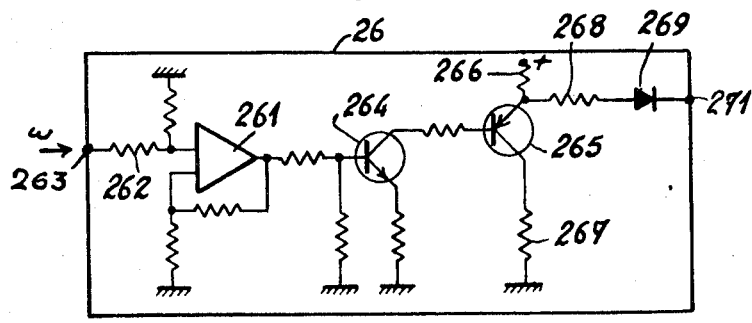

FIGS. 8 and 9, respectively similar to FIGS. 5 and 6, and FIG. 10, show modifications of the signals previously considered;

Figure 11:
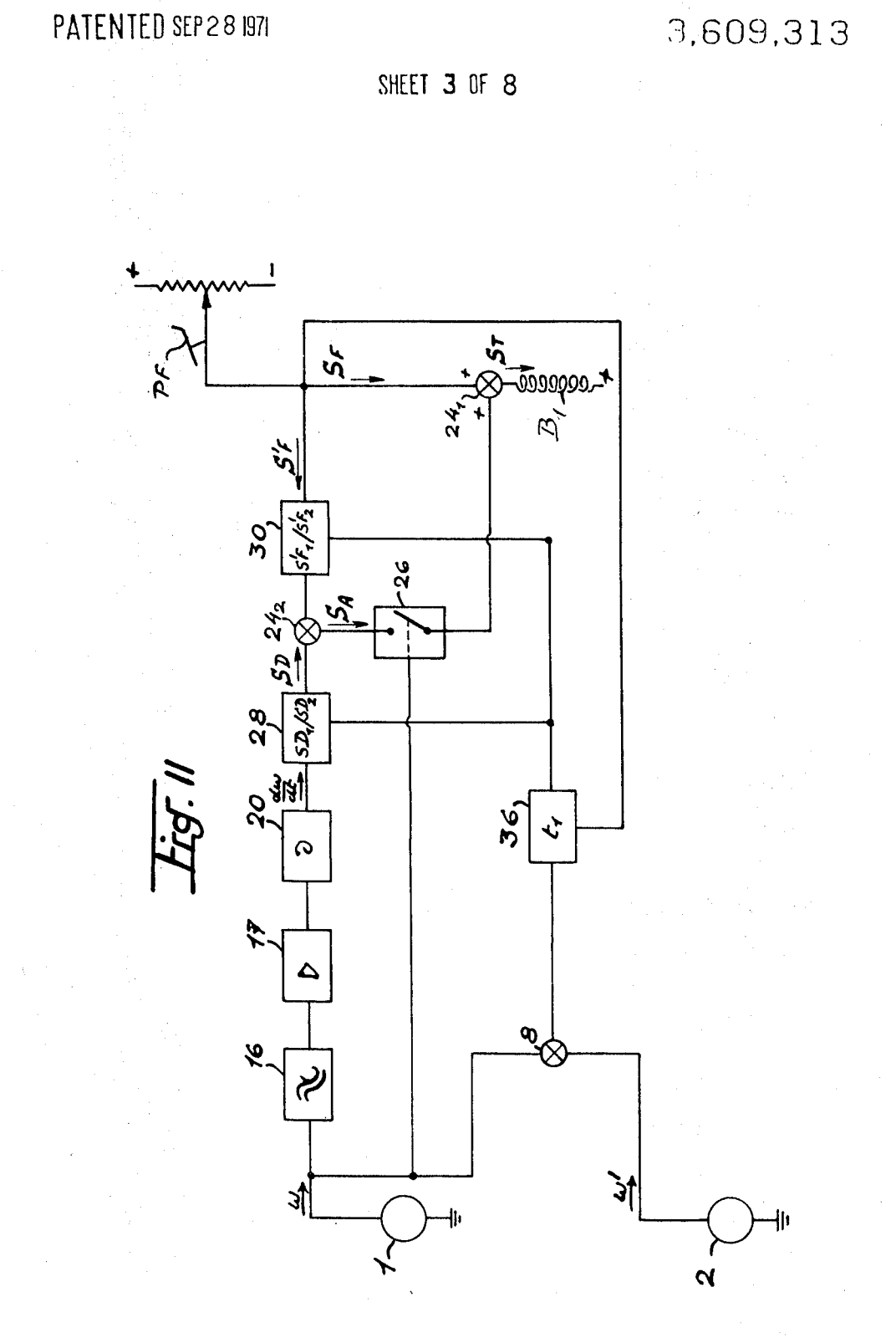

FIG. 11, similar to FIG. 3, shows improvements in the partial basic diagram according to the invention;

FIG. 12 represents an integral regulation of signal of slip in accordance with the invention;

FIG. 13 is a functional block diagram of one alternative form of the invention;

FIG. 14 shows the diagrams of the two input adapter units of FIG. 13;

FIG. 15 shows the diagram of the computer unit of FIG. 13;

FIG. 16 shows the diagram of the filter unit for the regulation by deceleration of FIG. 13;

FIG. 17 is the diagram of the acceleration differentiator unit of FIG. 13;

FIG. 18 shows the diagram of the deceleration differentiator unit of FIG. 13;

FIG. 19 is a diagram of the brake-pedal adapter unit of FIG. 13;

FIG. 20 shows the diagram of the comparator unit of FIG. 13;

FIG. 21 gives the diagram of the regulation cutoff or interruptor unit for low speeds, which cooperates with the comparator of FIG. 20;

FIG. 22 shows the diagram of the curve-correction unit, of the curve-changing unit and of the locking and time-delay unit of FIG. 13;

FIG. 23 shows the diagram of the integrator unit of FIG. 13;

FIG. 24 gives the diagram of the slip-corrector unit of FIG. 13;

FIG. 25 shows the continuity and the parabolic form of the regulation signal proportional to the slip in accordance with the invention;

FIG. 26 gives the diagram of the parabolic amplifier unit of FIG. 13, this amplifier supplying the signal, as shown in FIG. 25;

FIG. 27 shows the diagram of the low speed cutoff unit cooperating with the parabolic amplifier of FIG. 26.

The regulation circuit according to the invention adjusts the braking pressure exerted by the pilot of the vehicle, as a function of the deceleration of the vehicle and utilizes parameters which are free from rapid oscillatory variations, namely the algebraic derivative of the speed of the vehicle with respect to time and the braking effort given by the pilot and, whatever the state of the ground may be, thereby making it possible to obtain at every instant a braking pressure which is as close as possible to the optimum pressure.

The principle of operation of this regulation circuit is as follows: the pilot's braking effort corresponds to a given braking pressure and therefore a given braking torque. Under the best possible conditions of adhesion, a deceleration $\gamma$ of the vehicle corresponds to this braking torque.

The result is that if, for the same pilot's effort, it is found that the deceleration $\gamma'$ of the vehicle is lower ($\gamma' < \gamma$), this will mean that the conditions of adhesion are not so good as the optimum. Therefore, in comparing the pilot's effort and the deceleration of the vehicle, the invention effects a regulation of braking which reduces the braking pressure in proportion to the difference between the deceleration $\gamma'$ of the vehicle at the instant $t$ and the deceleration $\gamma$ which the vehicle should have under the best possible conditions of adhesion for the braking pressure corresponding to the pilot's effort.

This circuit for regulation by deceleration according to the invention is based on the use of a main control signal delivered by a comparator $24_1$ (FIG. 1) which generates the algebraic sum of two signals: the first signal $S_F$ comes from the brake-pedal $P_F$ (FIG. 1); this results at the input of the summation comparator $24_1$ in a positive signal $S_F$ (FIG. 2); the second signal SA is itself the algebraic sum of two signals $S'_F$ and $S_D$, this sum being generated in the comparator $24_2$ (see FIG. 3).

The first signal $S'_F$ of this sum also comes from the brake pedal $P_F$ (see FIG. 4). This results at the input of the summation comparator $24_2$ in the positive signal $S'_F$ (see FIG. 5). The second signal $S_D$ of this sum comes from the generator 1 driven by an unbraked wheel or by any other means of measurement of the speed of the vehicle. This signal $\omega$ is filtered at 16, amplified at 17 and differentiated with respect to the time at 20 (see FIG. 3).

At the input of the comparator $24_2$ this results in a signal SD which is negative and represents the deceleration or acceleration of the vehicle (see FIG. 6). The second control signal SA which is the algebraic sum of two signals, is applied to the input of the summation comparator $24_1$ and is added algebraically to the first control signal SF (see FIG. 3) This results in the coil $B_1$ of the control device TR in a positive signal $S_T$ which is a function at a given instant $t$, at $P_F$ and of the derivative with respect to time of the speed of the vehicle. By making-up the account of the various signals, there is obtained:

$$S_T = S_F + S'_F - S_D.$$

It is the algebraic sum of these three control signals which produces the signal $S_T$ in the coil $B_1$ and the flux which it creates in the said coil automatically determines the appropriate braking pressure in the control device TR (which, as already stated, has been described in applications Ser. No. 548,301).

If the braking pedal $P_F$ is not actuated, with the vehicle running at the speed $\omega$, $S_T$ is a maximum, the control device TR does not send any pressure into the brake, and there is no braking (in fact, the control device TR for the braking pressure delivers a pressure which is inversely proportional to the electric control signal).

If the pedal $P_F$ is actuated and kept fully depressed, the signal $S_T$ is positive. The signal is composed of two constant signals which are $S_F$ and $S'_F$ and a variable signal $S_D$.

According to the various forms of braking, and if it is assumed that the pedal $P_F$ is actuated and held fully depressed, the possibilities of variation of the signal $S_D$ are as follows:

On ground having a high coefficient of adhesion, in order that the braking may be optimum, it is necessary that the braking torque P to be applied to the wheels should be high (see FIG. 7). The signal $S_T$ must therefore be small, and as its components $S_F$ and $S'_F$ are constant, the component $S_D$ must itself be small. Now, when a vehicle is braked, it is obvious that at the start of braking the deceleration is zero or almost zero. If reference is made to FIG. 6, it is seen that for zero deceleration the signal $S_D$ is a minimum, therefore the regulation due to this circuit is a maximum and the pressure is low but not zero. This pressure will result in a deceleration of the vehicle from which there will result an increase in the value of the signal $S_D$.

It is found that the braking pressure will develop until the vehicle reaches the maximum deceleration corresponding to the conditions of adhesion encountered, but however this search for the optimum pressure (which is carried out at high speed) lasts for a certain time and causes a loss in performance. In order to eliminate this disadvantage, the circuit for regulation by deceleration according to the invention comprises two devices for reducing the time lost in finding the optimum pressure to that which is strictly necessary:

1. A device acting on the signal $S'_F$ causing a change in level depending on whether the braked wheel is situated below or above a reference slip $g2$ (see FIG. 7). This reference slip $g2$ is such that it is slightly greater than the slip $g1$ corresponding to the maximum adhesion $S_1$ of the law $\mu 1 = f(g)$ which is a characteristic of the best ground. This device ensures that:

When the slip of the braked wheel is below the slip $g2$, the level of the signal $S'_F$ is low (signal $S'_{F1}$ of FIG. 8);

When the slip of the braked wheel is higher than the slip $g2$, the level of the signal $S'_F$ is high (signal $S'_{F2}$ of FIG. 8).

2. A device acting on the signal $S_D$ and causing a change of slope, depending on whether the slip of the braked wheel is less than or greater than the slip $g2$. When the slip of the braked wheel is less than the slip $g2$, the slope $\alpha$ of the signal $S_D$ is low (signal $S_{D1}$ of FIG. 9). When the slip of the braked wheel is higher than the slip $g2$, the slope $\beta$ of the signal $S_D$ is steep (signal $S_{D2}$ of FIG. 9). In this case also, when the brake pedal is operated, since the deceleration at the start is zero or almost zero, the slip of the wheels at the start is also zero. In consequence, at the beginning of braking, the regulation circuit works with the signals $S'_{F1}$ and $S_{D1}$ which immediately register, through the intermediary of the control device TR, a high level of pressure in the brake. The optimum deceleration of the vehicle is thus obtained rapidly and the corresponding slip of the braked wheels is in the vicinity of the slip $g1$, but is less than the reference slip $g2$.

In conclusion, with braking under the best possible conditions of adhesion, the regulation circuit thus always works on the signal $S_T = S_F + S'_{F1} - S_{D1}$.

On ground having a low coefficient of adhesion however, in order that the braking may be effective, it is necessary that the braking torque to be applied should be low an that it corresponds to the maximum adhesion $S_2$ of the law $\mu 2 = f(g)$ shown in FIG. 7.

As previously, during the braking operation, the vehicle will start with zero or almost zero deceleration and zero slip of the wheels. The regulation circuit will work in consequence at the beginning of braking, with the signals $S'_{F1}$ and $S_{D1}$. There will thus result a high braking pressure which, due to the poor conditions of adhesion, may cause a substantial slipping of the wheels, which will rapidly become higher than the reference slip $g2$.

Experience has in fact shown, during tests on aircraft, that due to the rapidity of the phenomenon of starting to slip on the one hand, and on the other to the response time of the electrohydraulic circuit, there may occur instantaneous and temporary oversteps of the slip $g1$, corresponding to the maximum adhesion at the given moment. Due to the overstepping of the slip $g2$, the regulation circuit according to the invention will then work with signals $S'_{F2}$ and $S_{D2}$ (FIGS. 8 and 9) which will have the result of causing the pressure to drop considerably. The search for the optimum deceleration is then carried out, and the corresponding pressure will be rapidly found since this pressure will be relatively low.

The invention provides means for rendering irreversible the transition from the curves $S'_{F1}$ and $S_{D1}$ to the curves $S'_{F2}$ and $S_{D2}$ after a certain delay $t^1$ (see FIG. 11). It is only during this time $t_1$ that it is possible to pass from one curve to the other, depending on whether the slip of the braked wheel is less than or higher than the reference slip $g2$. This time delay proves necessary in the case of braking on ground which has a highly variable coefficient of adhesion. For example, if the braking is effected on ground with a high coefficient of adhesion and at a given instant $t$ there is encountered an area of low adhesion (pool of water, icy patch, etc.), it must be possible to drop the pressure very rapidly and to be able to find again the original pressure at the end of this area.

If the time-delay did not exist, the passing into a single area of low adhesion would be sufficient to pass from the curves $S'_{F1}$ and $S_{D1}$ to $S'_{F2}$ and $S_{D2}$ in a definitive manner. This would necessitate a fresh search for the optimum pressure with a corresponding loss of time and performance.

In conclusion, the locking action on the curves $S'_{F2}$ and $S_{D2}$ will only become effective after the sum of the times when the slip of the braked wheel exceeds $g2$ becomes equal to time $t_1$ (unit 36 of FIG. 11).

The circuit of regulation by deceleration, according to the invention, further comprises a device which makes it possible to obtain the maximum braking pressure when the vehicle is stationary (stopped on the ground in the case of an aircraft). This device has the function of short-circuiting the signal SA, the sum of two signals $S'_F$ and $S_D$, below a certain speed $v$ of the vehicle, this being a reference speed determined in advance (unit 26 of FIG. 11).

There will now be described the integral regulation circuit according to the invention, and in the first place its advantages will be stated. When a vehicle is braked with the device according to the invention, comprising the regulation by deceleration described above, there exist certain cases in which the braking regulator does not enable the minimum stopping distance to be obtained.

A first case relates to braking carried out on ground having an alternation of widely different coefficients of adhesion. During the passage over the zone of low adhesion, if this latter is sufficiently wide, the result for the operation of the regulator is a locking of the deceleration regulation on the curve $S_{D1}+S'_{F1}$ shown in FIG. 10. In consequence, in the next following phase of the braking, during arrival on a zone of medium or high adhesion, the slip of the braked wheel will be reduced, which results in an increase of the braking pressure, together with a corresponding increase in the deceleration of the vehicle.

The vehicle will not however reach its stabilized deceleration until after a search time during which the braking pressure will vary. This time increases as the difference between the coefficients of adhesion of the two zones increases. It is therefore found that this search time is a disadvantage in obtaining the shortest stopping distance, since it does not permit the optimum braking pressure to be immediately applied when the adhesion between the tires and the ground varies in a substantial manner.

The second case concerns braking effected with a brake, the torque of which is subject to inherent variations for a given pressure. These variations may be caused for example by the reduction of the coefficient of adhesion of the friction linings due to considerable increase in temperature of a disc-brake during braking at high power. When the brake develops a torque lower than that which it should give, the result is a reduction of the the value of the deceleration of the vehicle. Through the intermediary of the regulation by deceleration, this reduction causes a corresponding drop in pressure. This is undesirable since, on the contrary, in such a case the pressure should be increased so as to compensate for the loss of torque associated with the brake.

In order to obtain the optimum operation of the braking regulator, in this case in particular, an integral slip regulation has been added according to the invention. Its principle is as follows:

Two signals are added together algebraically: the slip signal $g$ of the braked wheel and a signal representing a reference slip $gc$.

For a pilot's order for maximum braking, this reference slip is chosen as being the most probable value which corresponds to the abscissae of the maximum adhesion of the characteristic curves of $\mu$ as a function of $g$ (see FIG. 7). In addition, this reference slip is proportional to the pilot's order which permits progressive braking to be retained. The algebraic sum of these two signals is sent to an integrator. The output signal $Si$ from this integrator is positive or negative (FIG. 12), depending on whether the slip of the braked wheel is greater or less than the reference slip. This signal $Si$ is sent through the comparator $24_1$ to the coil B1 of the control device TR, which produces an instantaneous correction, upwards or downwards of the braking pressure.

It is found that the passage from a braking zone of low adhesion to a zone of medium or high adhesion, like the fall in torque caused by the brake, results in a variation of slip of the braked wheel.

The integral regulation of slip such as described above, will thus correct the braking pressure in both cases, in such manner as to retain the optimum slip of the braked wheel.

By way of nonlimitative example, there will now be described below a form of construction according to the invention of a braking control based on the principles which have just been explained, and comprising, with the regulation circuits which have been described above, the parts necessary for their construction. This embodiment will be described on the one hand with reference to FIG. 13 which is a functional block diagram of the control, and on the other hand to FIGS. 14 to 27 which show the diagrams of these units.

With reference to FIG. 13, this embodiment of the invention comprises two tachometer direct current generators, of which one, 1, measures the speed of rotation $\omega$ of an unbraked wheel (for example the front wheel of an aircraft) and delivers a direct current voltage proportional to the speed of the vehicle, while the other generator 2 measures the speed of rotation $\omega'$ of the braked wheel and delivers a voltage proportional to that speed:

A brake pedal PF which is the braking control member utilized by the pilot;

a regulation box BR;

A transducer TR with four coils B, which is the actuating device, receiving electric signals and delivering the hydraulic pressure which actuates the brakes. As has already been stated, this transducer TR has formed the subject of the said application Ser. No. 548,301 and will not therefore be further described here.

In FIG. 13, the box TR is shown, solely for the sake of clearness of the description, with broken lies separations which make it possible to distinguish: at the top the parts common to the various circuits (adapters, amplifiers, computer); beneath (between two double broken lines) the regulation circuit by deceleration; further below (between two double broken lines) the integral slip regulation circuit; and at the bottom, the circuit for regulation proportional to the slip. The circuit for deceleration regulation (at the top of FIG. 13) is itself subdivided into differentiator circuits (coil B1), interruption at low speeds and change of curves.

In more detail, the box BR of FIG. 13 comprises, as members common to the various regulation circuits, an adapter 3 for the generator 1, an adapter 4 for the generator 2, with an amplifier 5 at the output of the adapter 4 and an amplifier 6 at the output of the adapter 3, and a slip computer 8 followed by an amplifier 9.

The circuit for regulation by deceleration comprises a filter 16, an amplifier 17, a differentiator 18 of the signal $\omega$ as a function of time, giving a signal proportional to the acceleration of the vehicle, a differentiator 20 of the same signal $\omega$ as a function of time, giving a signal proportional to the deceleration of the vehicle, the two differentiators 18 and 20 acting on a comparator 24 which is further subject to the action of the brake pedal PF and to its adapter 22, and supplying the coil B1. This comparator 24 corrects the pressure level recorded by the pilot as a function of the deceleration of the vehicle.

The circuit for regulation by deceleration further comprises a unit 26 for interruption at low speeds, acting on the comparator 24. The circuit for regulation by deceleration finally comprises a corrector unit 28, a unit 30 for changing curves and a unit 36 for locking and time-delay, which units interconnect the differentiator 20 and the adapter 22, with the computer 8. This system permits the registration of two functions of pressure as a function of the deceleration, according to the conditions of adhesion and to the value of the slip of the braked wheel, with locking after a time-delay.

The circuit of integral regulation on slip comprises the integrator 38 and the slip corrector 40, which interconnect the differentiator 18 and the adapter 22, with the computer 8. This system checks the difference between the slip of the braked wheel and a reference slip servo-controlled by the pilot's braking effort.

The circuit for regulation proportional to the slip comprises, in addition to the application of the signals $\omega$ and $\omega'$ respectively to the coils B2 and B3, a parabolic amplifier 46 which supplies the coil B4, and an interruptor unit 48 for low speeds which acts on the amplifier 46.

With reference to FIG. 14, the tachometer generator 1 for the unbraked wheel is connected, inside the regulation box BR, to an adapter 3 comprising an attenuation resistance 31 and a condenser 32 intended to eliminate the background noise, and to a group of resistances 33 and 34, having the center point connected to ground. Similarly, the tachometer generator 2 for the braked wheel is connected, inside the regulation box BR, to an adapter 4 similar to that above.

Returning now to FIG. 13, the negative output of the adapter 4 supplies amplifier 5, which is conventional and will therefore not be described. Similarly, the output of the adapter 3 is fed to convention amplifier 6.

The computer 8 (which is common to the regulation circuits) will now be described with reference to FIG. 15.

The signal of the speed $\omega$ of the unbraked wheel is led from one output of the amplifier 6 to an input 81 of the integrated amplifier 82 by a resistance 83. The integrated amplifier 82 has its second input connected to ground through a resistance 84. This amplifier has reverse feedback by the resistance 85 and the double transistor 86. One of the transistors of 86 has its base connected to ground, its collector connected to the input of 82 and its emitter connected to 85. The other transistor of 86 has its emitter connected to 85, its base and its collector being coupled together and to the input of the integrated amplifier 87.

This unit effects the calculation of the logarithm of $\omega$. To the input of the amplifier 87 there is applied a positive voltage through a resistance 88. There is therefore at the input of 87 a current which represents $a - \log \omega$. The second input of the amplifier 87 is connected to ground through the resistance 89, the amplifier being given reverse feedback by the resistance 90. The output of the amplifier 87 is connected to the base of the transistor 91 by the resistance 92. At the same time, a current proportional to $\omega$ from the input 93 is led to the base of the transistor 91 through the resistance 94. The base of the transistor 91 thus receives a current proportional to $(1/\omega) \cong a$. $- \log \omega + b\omega$.

This current is amplified by the transistor 91, the emitter of which is connected to ground through the resistance 95 and the collector is simultaneously connected to a negative potential through the resistance 96 and to the emitters of the two transistors of the double transistor 97 through the resistance 98.

On one of the bases of the double transistor 97 is applied a current proportional to the difference $(\omega-\omega')$, this difference being effected in the amplifier 99 to which is fed a current proportional to $\omega'$ from the input 100 through the resistance 101, and a current proportional to $\omega'$ through the resistances 102 and 103 (103 is connected to ground and provides a zero adjustment of the amplifier 99). The amplifier 99 has reverse feedback through the resistance 104. The output of 99 is connected to the base of the double transistor 97 as described above, through the resistances 104 and 105 (105 is connected to ground and provides a zero adjustment of the double transistor 97).

The other base of the double transistor 97 is connected to ground through a resistance 106 and to a source of negative potential through the resistance 107. The two collectors of 97 are connected to the inputs of the integrated amplifier 108, one of the inputs being connected to ground through a resistance 109, the other input being connected to the output 111 through a reverse feedback resistance 110.

The combination 97+108 carries out the multiplication $(\omega-\omega')1/\omega$ and therefore its output 111 delivers a signal $g$ which represents the slip of the braked wheel.

The output 111 of the computer 8 is connected to an amplifier 9 (see FIG. 13), which may be a conventional amplifier which will not therefore be described.

There will now be described the circuit for regulation on deceleration (upper portion between two double broken lines of FIG. 13). The low-pass filter 16, being utilized in the case of measurement of the speed of an aircraft, which measurement is effected at the level of the front wheel of this latter, it follows that when a braking torque is applied to the brake, the aircraft tilts forward, which increases the load on the front landing gear. This results in a compression of the pneumatic tire and therefore a reduction of its effective radius under load, which consequently causes a momentary angular acceleration of the front wheel. This is detected by the generator 1 and is transmitted to the regulation circuits, which disturbs the measurement of the true speed of the aircraft.

The low-pass filter 16, intended to eliminate these stray oscillations, receives, with reference to FIG. 16, the two signals coming from the adapter 3, namely the signal $+\omega$ at its input 161 and the signal $-\omega$ at its input 162. It comprises a condenser 163, short-circuited by the transistor 164 when the input signal increases, by means of the condenser 165 connected between the positive pole of the generator 1 (input 161) and the base of this transistor. The combination of the transistor and condenser is intended to shift the phase of the input signal by 180°.

The potentiometer 166 permits the summation of the original signal and the dephased signal and, in the case of a periodic signal, this sum gives a direct current resultant. The two condensers 167 effect an additional filtration, and the resistances 168 are matching resistances. The filtered signal is received on the slider of the potentiometer 166, connected to the output 169 and also to the amplifier 17 (FIG. 13) which is a conventional amplifier which will not require any further description.

The output of the amplifier 17 is directly connected to the input 181 of the acceleration differentiator 18 (see FIG. 13) which will be described with reference to FIG. 17.

This differentiator has for its object to prevent the braking pressure from dropping to its minimum value in the event of appearance of a stray acceleration on the signal $\omega$ from the tachometer generator 1. It is complementary to the filter 16 referred to above. This differentiator gives a negative signal proportional to the acceleration of the unbraked wheel. It comprises a condenser 182 serving as a differentiator. The differentiated signal is then sent to the integrated amplifier 183 with high gain and phase reversal. The resistance 184 creates the total negative feedback necessary for obtaining the differentiated signal, and a condenser 185 permits high frequency oscillations to be eliminated. The output signal from 183 is amplified by the transistors 186 and 187, passing through the coupling resistances 188 and 189, and passes out at 190 on the load resistance 191.

The condenser 192 damps the output signal in order to prevent a drop of pressure in the brake during the passage at zero acceleration in the case of stray oscillations of the signal $\omega$ from the tachometer generator 1. This damping in fact enables an overlap to be obtained on the signal passing out of the deceleration differentiator. The negative signal collected on the terminal 190 through the resistance 193 is added to the signal of the differentiator "deceleration" (see below).

The output of the amplifier 17 is also directly connected to the input 201 of the deceleration differentiator 20 (FIG. 13), which will be described with reference to FIG. 18. This differentiator gives a signal proportional to the deceleration of the vehicle. It comprises a condenser 202 serving as a differentiator. The signal delivered passes through the integrated amplifier 203 with high gain and reversal of phase. The resistance 204 and the condenser 205 have the same functions as the corresponding members of the differentiator 18.

The deceleration signal obtained at the output of 203 is then amplified by the transistors 206 and 207, the coefficient of amplification being adjustable by the potentiometer 208. The resistances 209 and 210 are coupling resistances, the resistance 211 being a load resistance, at the terminals of which the output signal (which is negative) is collected at 212 and 213. The condenser 214 has the function of damping the rapid variations of deceleration. The condenser 202, connected on one side to the input 201, is connected by its other terminal to an output 215 which goes to the corrector unit 28.

The output 190 of the unit 18 and the output 212 of the unit 20 are connected together and to the input 241 of the comparator unit 24 (see FIG. 13). This comparator unit 24 is controlled by the pedal adapter unit 22, which will be described with reference to FIG. 19. The brake pedal PF actuates the slider of the potentiometer 221, connected to the inputs 222 and 223 of the unit 22, the input 222 being supplied in series with a resistance 224, and the input 223 being returned to ground through an adjusting potentiometer 225. The slider of the potentiometer 221 is connected to the input 226 of the unit 22, connected by a regulating potentiometer 227, on the one hand to three outputs 228, 229 and 230 and on the other hand to a resistance 231 and a diode 232, the cathode of which is connected to the base of a transistor 233 in which the emitter is connected to ground and the collector to the output 234.

With reference to FIG. 20, the comparator unit 24 enables the output signal from the adapter unit 22 for the pedal and applied to its input 242 to be compared with the deceleration signal coming from the differentiator units 18 and 20 and applied to its input 241. The comparator unit 24 comprises a transistor 243 having its base connected on the one hand to an input 244 and on the other hand to the cathode of a diode 245 connected by a resistance 246 to the input 242.

This transistor 243 has its emitter connected to ground through a resistance 247 and its collector to the possible pole through resistances 248. The collector is coupled, by a resistance 249, on the one hand to the input 241 and on the other to a resistance 251 and a potentiometer 252, and finally to the base of a transistor 253, the emitter of which is connected to ground and the collector to the outputs 254 and 255.

Thus, this transistor 253, connected in parallel with the transistor 233, controls the current in the coil B1 of the transducer TR, this coil being such that the braking pressure diminishes when the current passing through it increases. The transistor 233 which supplies the signal SF is controlled directly by the slider of the potentiometer 221.

The potentiometer 252 and the resistance 251, supplied with negative current, enable the current to be regulated in the coil B1 (signal $S'_F$) in such manner as to obtain a minimum predetermined pressure for zero deceleration of the aircraft. This permits the starting of the braking and search for the optimum pressure. The output of the differentiators (signal SD) is connected to the base of the transistor 253 in such manner that as the deceleration increases (the output signal from the differentiators being negative), the transistor 253 reduces the current in the coil B1 (signal ST); the braking pressure therefore increases. At the maximum, for a very high deceleration, the transistor 253 does not deliver any more current $S_A$ (or in other words, $S'_F - S_D = 0$).

Referring now to FIG. 21, the unit 26 has been provided in order to be able to obtain the full pressure in the brake when the aircraft is stationary, this unit bringing the signal $S_A$ passing out of the comparator 24 to zero at low speeds. For this purpose, the positive voltage $\omega$ of the tachometer generator of the unbraked wheel 1 is applied to the integrated amplifier 261 through the resistance 262 connected to the input 263. The output voltage of 261 controls the two transistors 264 and 265. The emitter of 265 is at a positive potential through the resistance 266 and its collector is connected to ground through the resistance 267.

In the absence of the signal $\omega$ from the tachometer generator 1, that is to say if the vehicle is stationary, the positive potential of the emitter 265 is sent through the resistance 268 and the diode 269, the cathode of which is brought out at 271 to the base of the transistor 243 of the unit 24 (see FIG. 20). This transistor is then completely conductive and its collector is grounded through the resistance 247, which considerably reduces the positive potential at this point and therefore blocks the transistor 253. As soon as a voltage appears at the generator 1, the integrated amplifier 261 of the unit 26 delivers an output voltage which renders the transistors 264 and 265 conductive and causes a drop in potential of the emitter of 265 connected to ground through the resistance 267, which enables the transistor 243 to function normally.

There will now be described with reference to FIG. 22, the curve-correction unit 28, the curve-changing unit 30 and the locking and time-delay unit 36 of FIG. 13, these three units cooperating together closely so that they cannot be separately described.

It has already been stated that in order to improve the performance, the deceleration differentiator 20 operates with two different coefficients of amplification, giving two current curves as a function of the deceleration (see FIG. 9): the curve $SD_2$ is obtained by the deceleration differentiator 20, and the curve $SD_1$ is obtained by reducing its amplification.

With reference to FIG. 22, the corrector unit 28 comprises a transistor 281, the collector of which is connected by a resistance 282 to the output 283, which is in turn connected to the input 215 of the unit 20. The transistor 281 thus puts the resistance 282 in shunt with the input of the amplifier 203 of the unit 20 when the slip of the braked wheel exceeds the value of the reference slip $g2$.

In addition, the minimum pressure level corresponding to a zero deceleration of the vehicle is adjusted (curve $S'_{F1}$, FIG. 8) by means of the transistor 284 which connects to ground the base of the transistor 253 of the unit 24 through the resistance 285. These two transistors 281 and 284 are controlled through the resistances 287 and 288 by the positive potential of the collector of the transistor 301 of the unit 30. The resistances 289 and 290 bias the bases of the transistors 281 and 284 to a negative potential in order to create a release threshold. The transistor 301 is controlled through the resistance 303 by the positive signal on the input 302 derived from the control potentiometer 221 by the output 228 of the adapter unit 22.

The order for changing the curve $S_A = f(d\omega/dt)$ (FIG. 10) is obtained by means of the current derived from the slip computer 8 when the slip of the braked wheel is greater than the reference slip $g2$. This current is applied to the base of the transistor 304 through the resistance 305 and the input 306, the emitter being grounded and the collector coupled to the base of the transistor 307 by the resistance 308. When a slip of the braked wheel appears which is greater than the preregulated threshold $g2$, the transistors 307 and 304 are rendered conductive and the collector of the transistor 301 is connected to ground through the resistance 309, thus causing its positive potential to drop and cancelling the effect of the transistors 281 and 284 of the unit 28 on the deceleration differentiator 20.

In order to obtain a locking effect on the curve $S_{A2}$, the positive voltage which appears on the collector of the transistor 307 of the unit 30 when this latter is rendered conductive, is reinjected on the base of the transistor 304 through the transistor 361 and the resistance 362 of the unit 36. Thus, when the slip of the braked wheel causes the conductive state of the transistors 304 and 307, the base of 304 is maintained at a positive potential, which has the result, when the slip signal disappears, of keeping the transistors 304 and 307 conductive; the output signals of deceleration differentiator 20 thus remain on the curve $S_{A2}$.

In order to return to the curve $S_{A1}$, it is necessary for the pilot to release the control pedal PF, which causes the transistor 301 of the unit 30 to become conductive and the disappearance, due to the fact that the emitter is connected to ground, of the positive potential which kept the transistors 304 and 307 conductive.

The locking time-delay is obtained by the control of the transistor 361, the base of which receives the positive signal of its collector through the resistances 363 and 364. Between these two resistances and through a diode 365 having its cathode connected to one terminal of the condenser 366, which is connected to ground by its other terminal, the positive potential derived from the collector of 307, when the latter is rendered conductive, charges this condenser 366.

Whenever the slip of the braked wheel exceeds the reference slip $g2$, the condenser 366 will become charged proportionately to the time for which the slip remains greater than $g2$, and will remain charged by reason of the diode 365. When the charge of the condenser reaches a sufficient level, the positive potential derived from the collector of 307, when this latter is rendered conductive, can be applied to the base of the transistor 361 which is thereby rendered conductive. This has the effect of locking the curve-changing device.

The time-delay on the locking is thus constant and independent of the frequency of the variations of the slip about the reference slip $g2$. When the pilot releases the brake pedal, this has the effect of cancelling the locking and resetting the time-delay so as to be ready to recommence the cycle.

In order to discharge the condenser 366, this latter is short-circuited by the transistor 367. This transistor is controlled by the positive current obtained from the slider of the potentiometer 221 through the adapter 22 and the resistance 368, and by a constant negative potential brought in through the resistance 369. It is therefore only necessary to release the brake control pedal PF and therefore to increase the positive potential on 368, to annul the negative potential of 369 and to release the transistor 367 which discharges the condenser 366.

The circuit of integral regulation of slip comprises an integrator unit 38 which will be described with reference to FIG. 23. This integrator unit 38 comprises an integrated amplifier 381 with reverse feedback by a resistance 382 in parallel with a condenser 383. The inputs of 381 are connected, one 384 to the output of the amplifier 9 described above through the resistances 385 and 386 (386 being connected to ground so as to adjust the zero of the amplifier 381), the other to a fixed potential corresponding to the reference slip $gc$ applied to the input 387, with adjustment by a potentiometer 388 (one of the extremities of which is connected to earth and the other to a constant positive potential) and a resistance 389.

The output of 381 is connected to the base of the transistor 253 of the unit 24 (outputs 390 and 241) through an assembly comprising:

Two arms mounted in parallel, one of which is composed of a diode 391 and a resistance 392, while the other is composed of a diode 393 and a resistance 394;

A potentiometer 395, one extremity of which is grounded while the other is connected to the two arms described above, the slider being connected to the base of the transistor 253 through the resistance 396.

The circuit of the integral regulation on slip further comprise a corrector unit 40 which will be described with reference to FIG. 24. The reference slip must in fact be corrected as a function of the pilot's breaking effort so as to preserve the possibility for the pilot to vary the braking as he wishes.

This corrector 40 comprises a transistor 401 having its emitter connected to ground through a resistance 402. Its collector (terminal 403) is directly connected to the terminal 387 of the unit 38, and thus to the common point of the resistance 389 and the slider of the potentiometer 388. The control of the base is effected from the pilot's effort derived (terminal 404 connected to terminal 230 of the unit 22) from the common point of the potentiometer 227 and the resistance 231 of the unit 22, through the resistance 405 and the divider bridge composed of the resistance 406 connected to a source of negative voltage, and the resistance 407 connected to ground.

There will now be described the circuit for proportional regulation of slip. Referring to FIG. 13, the amplifier 6 sends the signal $\omega$ to the coil B2 of the transducer TR and the amplifier 5 sends the signal $\omega'$ to the coil B3. The output of the coil B2 returns to the negative and that of coil B3 to the positive. It is specified that the choice of the polarities and currents is such that, for a given voltage at the output of the generators, the current in the coil B2 causes a reduction in the utilization pressure at the output of the transducer TR, while the current in the coil B3 causes an increase in this pressure.

The output of the amplifier 9, on which there is found the signal $g$ corresponding to the slip of the braked wheel, is connected to the input 461 of a parabolic amplifier 46. In the U. S. Pat. No. 3,394,967 there is employed a system with several successive values of the gain of the regulation of the braking pressure as a function of the slip, the changes in gain being two in number (or even three, taking into account the correction at low speed) and these are abrupt since they are controlled by the voltage threshold devices.

On the contrary, according to the present invention, while there is again employed the principle of this variable gain regulation of the braking pressure as a function of the slip, taking account of the other arrangements of the invention, this variation in gain is continuous, that is to say progressive, and it supplies a signal which increases in a perfectly uniform manner and more and more rapidly, following a parabolic shape, as shown in FIG. 25.

The parabolic amplifier 46 will now be described with reference to FIG. 26.

The amplified slip signal, led in by the terminal 461, is applied to the base of the transistor 462 across a bridge formed by three arms connected in parallel. The first arm comprises a resistance 463, the second arm has a diode 464 in series with a resistance 465, and the third arm comprises two diodes 466 and 467 connected in series with a resistance 468. The output of this bridge is connected to the base of the transistor 462 through a potentiometer 470. The emitter of the transistor 462 is connected directly to an input 471 utilized for the cutoff at low speed (see below). The collector of 462 is coupled by an output 473 to the coil B4 of the transducer TR through the intermediary of a resistance 472 (see FIG. 13). There is thus obtained in this coil a current which is a parabolic function of the slip $g$ G (see FIG. 25).

There will now be described with reference to FIG. 27, the unit 48 for interruption at low speed, which cooperates with the above-described parabolic amplifier. This system has for its object to interrupt the regulation at the level of the coil B4 for low speeds. In fact, on certain vehicles in which the mounting of the wheel axles has a certain elasticity, this regulation may result, in the vicinity of the stationary condition, in a full-on or full-off operation which induces high frequency vibrations at the level of the wheel.

The base of the transistor 481 is controlled by the positive voltage $\omega$ from the tachometer generator 1 of the unbraked wheel, applied to the input 482 through the resistance 483. The emitter of 481 is connected to ground and its collector is connected to the positive pole of the supply through the resistance 484. This collector controls the base of the transistor 485 through the resistance 486. The emitter of 485 is positively biased through the potentiometer 487, which provides the adjustment of the cutoff threshold, the current derived from the collector of 485 through the intermediary of the resistance 488 is applied to the base of the transistor 489, connected between ground and the output 490 of the unit 48, which is connected to the input 471 of the unit 46 (and to the collector of the transistor 462 of this unit 46).

By this means, when the speed of the vehicle decreases, the potential at the collector of 481 increases, and when this potential becomes higher than that of the emitter of the transistor 485, the latter becomes blocked and the positive signal applied by the potentiometer 487 is no longer supplied to the base of 489, which isolates the emitter of 462 from ground. There is therefore no current flowing in the coil B4.

In conclusion, there has been described the operation of a device for the control of braking of a vehicle on wheels, comprising three regulation circuits with a slip computer, and there has also been described an example of the construction of the device.

The invention is not however limited to the apparatus described above, which may be replaced by different devices fulfilling the same functions. Thus, the speeds may equally well be measured by alternators, impulse generators, radar systems, etc. The measurement of the acceleration and deceleration of the vehicle may also be effected by means of accelerometers. The potentiometer for the control of braking may also be replaced by a mutual inductance system. It is also possible to use an electrohydraulic transducer delivering the full braking pressure for a maximum current.

What I claim is:

1. A regulation system for the control of braking of a vehicle with pneumatic tires, said system comprising first, second and third regulation circuits and a slip computer, said first regulation circuit generating a signal which is a function of the deceleration of the vehicle and of the pilot's braking effort, said second circuit being for integral regulation with respect to a slip having a predetermined reference value proportional to a signal representing the pilot's braking effort, and said third circuit being for regulation as a function of the slip, with said circuit having continuously variable gain, said computer being connected to said circuits to receive at its inputs signals representing the angular speed $\omega$ of the vehicle and $\omega'$ of a braked wheel and multiplying their difference by the sum of a constant and a factor proportional to $\omega$ reduced by a factor proportional to the logarithm of $\omega$ to provide an output signal representing wheel slip, the outputs of said regulation circuits and computer being employed to effect brake action.

2. A regulation system as claimed in claim 1, in which said first regulation circuit has two levels of gain for the pilot's signal and for a signal representing the vehicle speed, and means for reducing said two gains when the slip exceeds the value of a reference slip.

3. A regulation system as claimed in claim 2 comprising means for locking said reductions of gain after a predetermined time-delay.

4. A regulation system as claimed in claim 1, further comprising two devices coupled to said regulation circuits to render said regulation circuits inoperative at low running speeds of said vehicle.

5. A regulation system as claim in claim 1, in which said first regulation circuit comprises a band-pass filter at the input of said vehicle-speed signal.

6. A regulation system as claim in claim 5, in which said band-pass filter comprises a transistor to which signals are applied in opposition on its base and its collector, a condenser connected between the emitter and collector of said transistor, a potentiometer connected between the emitter and said base, the output being taken from the slider of said potentiometer with filtration by condensers and resistances.

7. A regulation system as claim in claim 1, in which the first regulation circuit comprises two differentiators for differentiating said vehicle-speed signal as a function of time, one for accelerations, the other for decelerations, the outputs of said differentiators being applied in parallel to a comparison device, together with the pilot's signal.

8. A regulation system as claimed in claim 1, in which, for the calculation of the logarithm of $\omega$, said computer comprises an amplifier with negative feedback and two inputs of which one is grounded, connected to the two emitters of a double transistor having one collector connected to the input of said amplifier, one base connected to ground, the other collector and the other base being coupled to an output amplifier.

9. A regulation system as claimed in claim 1, in which said third circuit includes a parabolic amplifier which comprises a transistor having the input signal applied to its base through a bridge having three arms connected in parallel, one arm comprising a resistance, the second arm comprising a diode in series with a second resistance, and the third arm comprising two diodes in series with a third resistance.

10. A regulation system for the control of braking of a vehicle with pneumatic tires, said system comprising first, second and third regulation circuits and a slip computer, said first regulation circuit generating a signal corresponding to a function of the deceleration of the vehicle and of the pilot's braking effort, said first circuit having two levels of gain for the signal representing pilot's braking effort and for the vehicle-speed signal, these two gains being reduced when the slip exceeds a reference value, said reductions in gain being locked after a predetermined time-delay, said first circuit comprising a band-pass filter at the input of the vehicle-speed signal, said band-pass filter comprising a transistor to which signals are applied in opposition on its base and on its collector, a condenser between the emitter and the collector, a potentiometer between the emitter and the base, the output being taken from the slider of said potentiometer with filtration by condensers and resistances, said first circuit further comprising two differentiators for differentiating the vehicle-speed signal as a function of time, one for accelerations, the other for decelerations, the outputs of said differentiators being applied in parallel to a comparison device simultaneously with the pilot's signal, said computer comprising, for the calculation of the logarithm of $\omega$ an amplifier with negative feedback and two inputs of which one is grounded, connected to the two emitters of a double transistor having one collector coupled to the input of said amplifier, one base being connected to ground, the other collector and the other base being coupled to an output amplifier, said second circuit being for integral regulation with respect to a predetermined reference slip proportional to the pilot's signal with two devices for rendering inoperative said regulation circuits at low speeds, said third regulation circuit acting as a function of the slip, with continuously variable gain of parabolic form, said computer receiving at its inputs the angular speed signals $\omega$ of the vehicle and $\omega'$ of a braked wheel, and multiplying their difference by the sum of a constant and a factor proportional to $\omega$ reduced by a factor proportional to the logarithm of $\omega$ to provide an output signal representing wheel slip, the output signals of said regulation circuits and computer being employed to effect brake action, said parabolic amplifier comprising a transistor having the input applied to its base through a bridge having at least three arms connected in parallel, one arm comprising a resistance, the second arm comprising a diode in series with a second resistance, and the third arm comprising two diodes in series with a third resistance.